(12) United States Patent
Kaufmann et al.

(10) Patent No.: US 9,558,239 B2
(45) Date of Patent: *Jan. 31, 2017

(54) RELATIONAL QUERY PLANNING FOR NON-RELATIONAL DATA SOURCES

(75) Inventors: Arthur F. Kaufmann, Culver City, CA (US); Haifeng Li, North Ryde (AU)

(73) Assignee: International Business Machines Corporation, Armonk, NY (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/549,681

(22) Filed: Jul. 16, 2012

(65) Prior Publication Data

US 2013/0006966 A1    Jan. 3, 2013

Related U.S. Application Data

(63) Continuation of application No. 13/157,130, filed on Jun. 9, 2011, now Pat. No. 9,177,021.

(51) Int. Cl.
*G06F 7/00* (2006.01)
*G06F 17/30* (2006.01)

(52) U.S. Cl.
CPC ... *G06F 17/30445* (2013.01); *G06F 17/30448* (2013.01)

(58) Field of Classification Search
CPC .. G06F 17/30424; G06F 17/30; G06F 17/303; G06F 17/30336; G06F 17/30371; G06F 17/30902; G06F 17/30445; G06F 17/30448
See application file for complete search history.

(56) References Cited

U.S. PATENT DOCUMENTS

| | | |
|---|---|---|
| 5,412,806 A | 5/1995 | Du et al. |
| 5,574,900 A | 11/1996 | Huang et al. |
| 5,588,150 A | 12/1996 | Lin et al. |
| 5,590,321 A | 12/1996 | Lin et al. |
| 5,640,555 A | 6/1997 | Kleewein et al. |

(Continued)

FOREIGN PATENT DOCUMENTS

EP    0490465 A2    7/1991

OTHER PUBLICATIONS

Polyviou et al.; "A Relationally Complete Visual Query Language for Heterogeneous Data Sources and Pervasive Querying", ICDE Proceedings, Apr. 5-8, 2005, pp. 471-482.

(Continued)

*Primary Examiner* — Azam Cheema
(74) *Attorney, Agent, or Firm* — Susan Murray; Edell, Shapiro & Finnan, LLC (57) ABSTRACT

A query plan for executing a query within a relational database system including at least one non-relational data source is generated by analyzing expressions that reference a non-relational data source within a query for the database system via an interface for that non-relational data source, determining for each analyzed expression at least one of the database system and interface capable of processing that analyzed expression for executing the query, providing an indicator for each of the analyzed expressions that indicates at least one of the database system and interface determined to process that analyzed expression, and generating the query plan for execution of the query, via the database system, based on the indicators for the expressions of the query.

6 Claims, 6 Drawing Sheets

(56) References Cited

U.S. PATENT DOCUMENTS

| | | | |
|---|---|---|---|
| 5,706,499 A | 1/1998 | Kleewein et al. | |
| 5,768,577 A | 6/1998 | Kleewein et al. | |
| 5,943,666 A | 8/1999 | Kleewein et al. | |
| 5,956,727 A | 9/1999 | Cheng et al. | |
| 6,009,265 A | 12/1999 | Huang et al. | |
| 6,009,428 A | 12/1999 | Kleewein et al. | |
| 6,282,537 B1* | 8/2001 | Madnick et al. | 707/716 |
| 6,370,530 B1 | 4/2002 | Kleewein et al. | |
| 6,526,403 B1 | 2/2003 | Lin et al. | |
| 6,615,203 B1 | 9/2003 | Lin et al. | |
| 7,124,413 B1* | 10/2006 | Klemm et al. | 719/313 |
| 7,315,872 B2 | 1/2008 | Narang et al. | |
| 7,461,052 B2 | 12/2008 | Dettinger et al. | |
| 7,464,084 B2 | 12/2008 | Huang et al. | |
| 7,519,577 B2 | 4/2009 | Brundage et al. | |
| 7,567,968 B2 | 7/2009 | Desai et al. | |
| 7,856,462 B2* | 12/2010 | Huang et al. | 707/713 |
| 2004/0260685 A1* | 12/2004 | Pfleiger et al. | 707/3 |
| 2007/0226186 A1 | 9/2007 | Ewen et al. | |
| 2008/0046427 A1 | 2/2008 | Lee et al. | |
| 2009/0055362 A1 | 2/2009 | Huang et al. | |
| 2010/0049694 A1 | 2/2010 | Deffler | |
| 2010/0205171 A1 | 8/2010 | Shmueli et al. | |
| 2011/0010379 A1 | 1/2011 | Gilderman et al. | |
| 2012/0317096 A1 | 12/2012 | Kaufmann et al. | |

OTHER PUBLICATIONS

Hsu et al.; "Semantic Query Optimization for Query Plans of Heterogenous Muitidatabase Systems", IEEE Transactions on, vol. 12, Iss. 6, Nov./Dec. 2000, pp. 959-978.

Roth et al, "Cost Models DO Matter: Providing Cost Information for Diverse Data Sources in a Federated System", IBM Almaden Research Center, San Jose. CA, (12 pages).

Haas et al., "Optimizing Queries Across Diverse Data Sources", IBM Almaden Research Center, San Jose, CA, pp. 276-285.

Carey et al.,"Towards Heterogeneous Multimedia Information Systems: The Garlic Approach", IBM Almaden Research Center, San Jose, CA, 1995 IEEE, pp. 124-131.

Roth et al., "A Wrapper Architecture for Legacy Data Sources", IBM Almaden Research Center, (21 pages).

Sellinger et al., "Access Path Selection in a Relational Database Management System", 1979.

* cited by examiner

RELATIONAL QUERY PLANNING FOR NON-RELATIONAL DATA SOURCES

CROSS-REFERENCE TO RELATED APPLICATIONS

This application is a continuation of U.S. patent application Ser. No. 13/157,130, entitled "Relational Query Planning for Non-Relational Data Sources", filed Jun. 9, 2011, now U.S. Pat. No. 9,177,021 the disclosure of which is incorporated herein by reference in its entirety.

BACKGROUND

1. Technical Field

The present invention relates to relational queries for data from different and diverse data sources, including non-relational data sources.

2. Discussion of the Related Art

The technique of SQL federation is used to integrate diverse data sources into a relational database system while allowing those sources to retain their individual identities. It can be an essential component of a successful information integration strategy. While the ideal is a seamless integration, in reality this is not always possible. As data sources diverge from the relational model (e.g., non-relational data sources such as XML files, real time web services, etc.), it becomes progressively more difficult to adapt them.

Data sources that deviate from the relational model present a number of challenges to SQL federation. One of the most problematic, due to its unpredictable nature, is that some syntactically valid queries may not be answerable by a relational engine, because the data source imposes non-relational semantics, such as dictating the order in which operations may occur.

BRIEF SUMMARY

Accordingly, embodiments of the present invention include a method, a computer program product and a system for generating a query plan for executing a query within a relational database system including at least one non-relational data source by analyzing expressions that reference a non-relational data source within a query for the database system via an interface for that non-relational data source, determining for each analyzed expression at least one of the database system and interface capable of processing that analyzed expression for executing the query, and providing an indicator for each of the analyzed expressions that indicates at least one of the database system and interface determined to process that analyzed expression, and generating the query plan for execution of the query, via the database system, based on the indicators for the expressions of the query.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

In accordance with embodiments of the present invention, a method, system and computer program product facilitate the querying of non-relational data sources utilizing relational type queries, such as SQL queries. In particular, the embodiments of the present invention facilitate the implementation of SQL federation for a variety of data sources, including both relational and non-relational data sources.

Structured Query Language (SQL) federation is a process in which a plurality of different data sources can be integrated in a manner so as to appear as a single relational database. Data sources may include relational databases, and also other relational or non-relational data sources, such as delimited text files, XML files or other custom-format files. The data sources can be of a variety of different types. For example, some data sources may be governed by specialized search algorithms over the data, while other data sources may not have any underlying data repository (such as a real-time web service).

An alternative to federation is replication or consolidation of data, where data from different data sources is copied or moved into a relational database, and application integration occurs to combine the data from the different sources into the relational database. Although replication/consolidation and application integration can be very useful in many situations, federation is advantageous over these other two data source combining techniques. In particular, federation provides the following advantages: data sources remain sovereign (retaining their location and other unique characteristics); federation presents a single standardized interface (e.g., SQL) that may be compatible with other (e.g., relational database) data sources or that can be utilized to accommodate interfaces for other data sources simplify application development; federation in a relational database takes advantage of existing, and powerful integration capabilities, such as a join operation for integrating (joining) data from two data sources; federation enhances the functionality of a data source by providing the ability to compensate for functionality that may be missing from a data source (e.g., by applying local processing); and federation can reduce data transfers (e.g., by allowing a data source to apply a filter function to data before data transfer, whereas a replication/consolidation operation would transfer all data first and then apply a filter to the data).

However, while the embodiments described below are in relation to use of SQL federation to combine or integrate data from different data sources, including data from a relational data source and/or data from a non-relational data source, it is noted that the present invention is not limited to SQL federation techniques. Instead, the present invention is also applicable to other techniques such as replication or consolidation of data.

Figure 1:
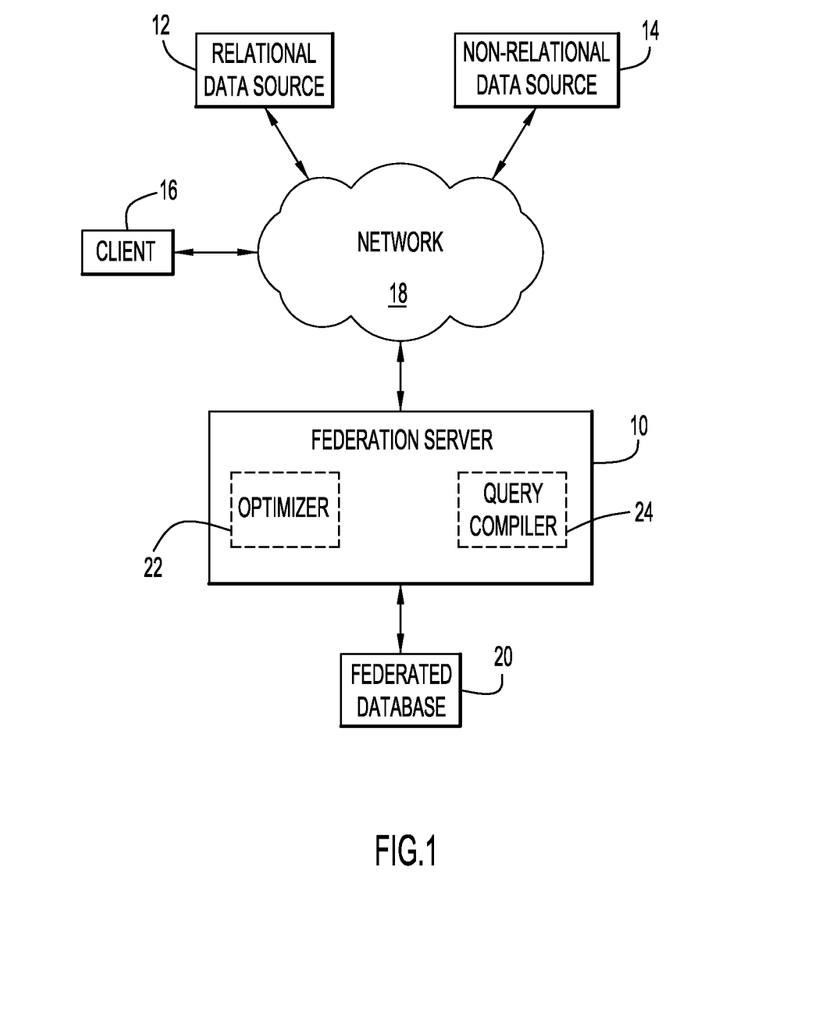
FIG. 1 is a diagrammatic illustration of an example computing environment for use with an embodiment of the present invention.

An example environment for use with present invention embodiments is illustrated in FIG. 1. Specifically, the environment includes a federation server 10, and a plurality of data sources, including a relational data source 12 and a non-relational data source 14, and any number of clients, such as client 16. While only two data sources and one client are shown in FIG. 1, the federation server 10 can operate to integrate data from any selected number of data sources, both relational and non-relational (e.g., three or more data sources), as well as interact with any number of clients.

The federation server 10 can be configured to only federate data between data sources external to the server 10 (e.g., where the federation server 10 does not include a data source). Alternatively, the federation server 10 can combine federation capabilities with a local relational data source, such as a federated database 18, that is associated with the federation server 10. In particular, a client 16 can access the federated database 20, via the federation server 10, to view combined data from relational data source 12, non-relational data source 14 and/or any other data sources, where the combined data has been integrated by the federation server 10 to appear as data from a single relational database.

The federation server 10 includes a processor comprising an optimizer 22 and a query compiler 24 that perform the functions of formulating and executing a query plan based upon a query received by the federation server 10 as described below. The federation server 10 can integrate data from a variety of different data sources, both relational data sources and non-relational data sources. A relational data source, such as data source 12, can be a relational database that stores data according to a relational model or schema (e.g., storage of data in a table), where such data can be accessed relatively easily by relational query processing by the federation server 10. A non-relational data source, such as data source 14, can be any other source of data including, without limitation, data sources providing data from delimited text files, data sources providing data from XML files, data sources providing data from a real-time web service, and/or data sources providing data from other custom-format files. As described in further detail below, data from such non-relational data sources is not easy to integrate with other data using typical relational queries, such as SQL queries.

The federation server 10 and data sources 12, 14 can communicate over a network 18. The network may be implemented by any number of any suitable communications media (e.g., wide area network (WAN), local area network (LAN), Internet, Intranet, etc.). Alternatively, the federation server 10 and data sources 12, 14 may communicate via any appropriate local communication medium (e.g., local area network (LAN), hardwire, wireless link, Intranet, etc.).

The federation server 10 (including optimizer 22, query compiler 24, and federated database 20), client 12, and data sources 12, 14 may be implemented by any conventional or other computer systems that may further be equipped with a display or monitor, a base (e.g., including a processor, memories and/or internal or external communications devices (e.g., modem, network cards, etc.)), optional input devices (e.g., a keyboard, mouse or other input device), and any commercially available and/or custom software (e.g., server/communications software, analysis module, browser/interface software, etc.).

Figure 2:
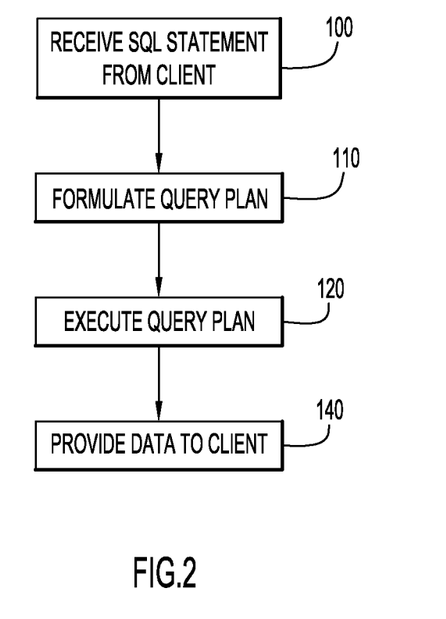
FIG. 2 provides a flowchart depicting an example method for facilitating SQL queries including non-relational data sources utilizing the example embodiment of FIG. 1 in accordance with an embodiment of the present invention.

Operation of the federation server 10 to process a query for data from a client 16, in which data must be integrated from sources such as relational data source 12 and non-relational data source 14, is now described with reference to the process flow charts of FIGS. 2 and 3. Initially, a client 16 communicates with the federation server 10 (via network 18) and provides a query for data in the form of an SQL statement (step 100).

The federation server 10 performs relational query processing in response to the client query in two phases or steps. In a first phase, and with reference to FIGS. 1 and 2, a query by the client 16 (e.g., an SQL statement) is processed by the federation server 10 and translated into a query plan (step 110). A query plan is a set of procedural instructions that, when executed, will produce the result desired by the declarative SQL statement. The second phase is execution of the query plan by the federation server 10 (step 120), where the query plan is used to direct the operations of obtaining and integrating data from the various data source in accordance with the query plan. After execution of the query plan, the data is provided to the client 20 (step 140). The query planning step is of great importance, since a proper query plan will determine whether the SQL statement is executed properly with the acquisition and integration of appropriate data from the different data sources. Therefore, the embodiments of the invention focus on the query planning step of the federation process (as shown in FIG. 3 and described in detail below).

In the query process, the term "nickname", as used herein, refers to a representation of data from a remote data source that appears to a user of the federation server 10 to be in the form of a relational table. A nickname has the characteristics of a table and can be referenced in many instances in the same manner in which a table can referenced for queries. In addition, the term "wrapper", as used herein, refers to a body of code (and associated persistent meta-data) that manages an interface between the federation server and a remote data source.

A simple example of a query planning step is now described, in which the query references a single table and requires only a few operators or less. As a specific example, consider the following query, labeled as query (1), which might require a SCAN operator and a FILTER operator for the query planning:

(1)  SELECT m.c3
     FROM mytab AS m
     WHERE m.c1 = 100
     AND m.c2 LIKE '%mine%'

Figure 4:
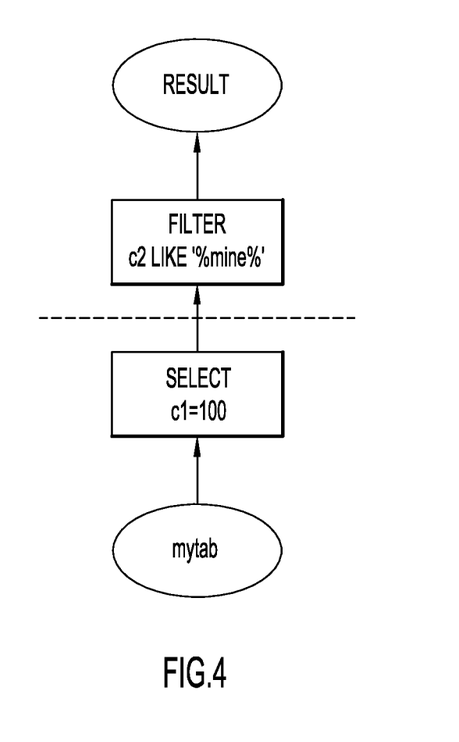
FIGS. 4-7 provide example query plans based upon different queries processed by a federation server.

The query plan is set forth in the flowchart of FIG. 4. In this scenario, assume that a SCAN operator can filter with an equality predicate on a numeric column, but cannot filter using the LIKE predicate. The resultant query plan would include the first operator to SCAN for c1=100, and then a second operator to FILTER for c2 LIKE '% mine %'.

While query (1) was a relatively simple example for obtaining data from a single table, query planning becomes more complicated when more than one table is involved. Joins between three or more tables can be processed in a pair-wise fashion. For example, for a query of data from three tables A, B and C, there can be six possible query plans for joining the tables: ((A, B), C), ((A, C), B), ((B, A), C), ((B, C), A), ((C, A), B) and ((C, B), A). Given that there are several different possible join operators (e.g., nested-loop, hash, hybrid-hash, etc.), the number of possible query plans can become enormous very quickly. In choosing between multiple plans, a cost-based optimization can be preformed to assign costs to each plan, where the cost can be determined based upon the resources that a query plan might use (e.g., CPU, I/O or network resources) and/or a prediction of the duration of the query in real time.

When federated data sources are processed, utilizing nicknames, the query planning can be different. Where a federation server will have exact knowledge of its own operators (e.g., knowledge that a SCAN operator can process simple predicates but not LIKE, as set forth in the above example), it has no such knowledge of the wrapper and remote data source. Instead, the federation server must engage in a dialog with the wrapper to determine which operations can be processed by the data source and which operations must be processed by the federation server.

In an example embodiment, the dialog between the federation server and the data source occurs in the following manner. First, the optimizer 22 of the federation server 10 identifies those parts of the query that may be processed by the remote data source (e.g., non-relational data source 14). The query compiler 24 of the federation server 10 then presents these parts or query fragments to the wrapper of the data source to form a request. A request can include the following: all of the nicknames (also referred to as quantifiers) that are associated with the data source, all of the projection or head expressions for each query fragment, and all of the predicates of the query fragments that are in conjunctive normal form (e.g., a set of predicates connected by AND operators). The data source wrapper identifies which query fragments (or portions of query fragments) the data source can process and those which it cannot. A reply is then provided from the data source wrapper to the federation server. The federation server then adds appropriate operators to the plan to compensate for any elements that the data source is unable to process.

As a modification to query (1), the table 'mytab' referenced in the query is replaced with 'mynick1', which is a nickname representing a relational table of data from a remote data source. The federation server 10 may present a query fragment (2) to the wrapper of the data source that is virtually identical to the original query (1):

| | |
|---|---|
| (2) | SELECT m1.c1, m1.c2, m1.c3 |
| | FROM mynick1 m1 |
| | WHERE m1.c1 = 100 |
| | AND m1.c2 LIKE '%mine%' |

The additional projected columns, m1.c1 and m1.c2, may be necessary in the case where the wrapper cannot process one or both of the predicates and the federation server must compensate.

In the event the data source is capable of processing both predicates, the reply from the wrapper would be identical to the original request. However, in the event one or both predicates could not be processed, the reply would contain only the predicate(s) that could be processed. For example, if the data source is capable of processing the integer equality operator but not the LIKE predicate, the reply from the wrapper might look like this:

| | |
|---|---|
| (3) | SELECT m1.c1, m1.c2, m1.c3 |
| | FROM mynick1 m1 |
| | WHERE m1.c1 = 100 |

In this scenario, the federator would need to add a FILTER operator to compensate for the missing predicate.

In a scenario in which there is a join between a nickname and a local table (e.g., a table from the federated database 20), the federation server 10 has options for the order in which it processes data (it may also have many choices as to what operator it uses to do this processing). In one option, the federation server 10 can extract all of the relevant rows from the nickname and then find matching rows from the local table itself (in this case, the nickname would be the outer part of the join). In another option, the federation server 10 can select rows from the local table and request the data source to find matching rows (making the nickname the inner part of the join). The choice between these two options can be decided based upon a cost factor associated with each choice (where the cost factor can be determined by the optimizer).

To look at this in more detail, consider the following query:

| | |
|---|---|
| (4) | SELECT l.c1, n1.c4 |
| | FROM mytab 1, mynick1 n1 |
| | WHERE 1.c2 < 50 |
| | AND n1.c5 = 1.c3 |
| | AND n1.c6 = 75 |

The federation server 10 may present the data source wrapper with the following query fragments:

| | |
|---|---|
| (5) | SELECT n1.c4, n1.c5, n1.c6 |
| | FROM mynick1 n1 |
| | WHERE n1.c6 = 75 |
| (6) | SELECT n1.c4, n1.c5, n1.c6 |
| | FROM mynick1 n1 |
| | WHERE n1.c5 = :H1 |
| | AND n1.c6 = 75 |

The notation ":H1" in query fragment (6) is used to describe a value that is provided to the data source at run time. In this particular scenario, ":H1" represents the value of column "c3" from table "mytab" for which the data source must find matching rows.

Figure 5:
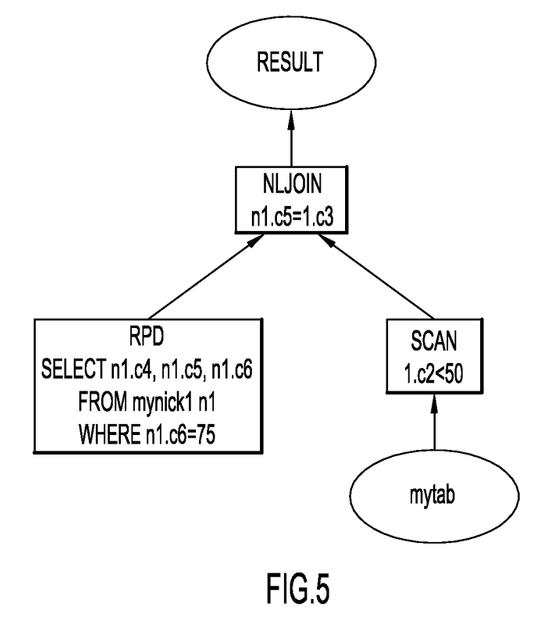
Figure 6:
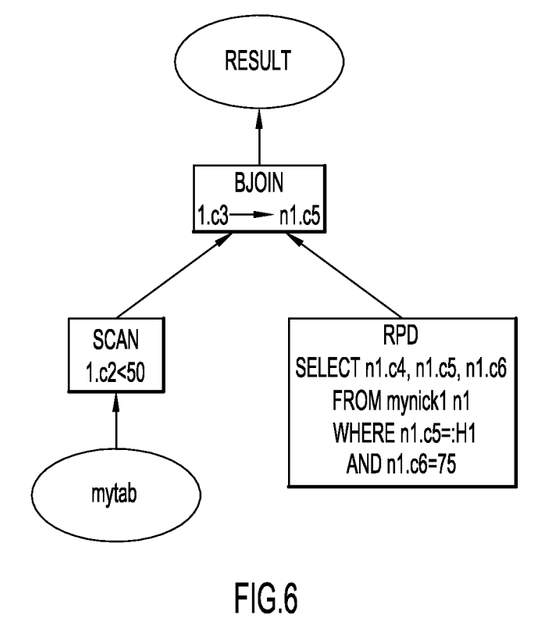

Two possible query plans that implement the query fragments (5) and (6) are depicted in FIGS. 5 and 6. In the query plan of FIG. 5, a nested-loop join (NLJOIN) is used as the join operator. In this scenario, the join is processed entirely by the federation server 10. This is one of many possible operators that may be used in this plan. In addition, a Remote Push-Down (RPD) operator is used in this plan. An RPD represents the work that a remote data source performs in executing the query fragment that it has negotiated with the query compiler 24.

For the query plan of FIG. 6, a bind join (BJOIN) operator is used. This join operator is specific to the federation system and allows some of the join work to be handled by one of the data sources. This BJOIN operator is equivalent to a local nested-loop join operator. It requires a parameterized query fragment on the inner stream of the join. As rows are fetched from the outer stream, values from those rows are extracted and submitted to the wrapper on the inner stream, where rows matching those values are then produced.

When there are joins between nicknames from the same remote data source, the federation server has even more options for query fragments. For example, the federation server can treat the nicknames as separate entities, just as it must for a join between a nickname and a local table, or it can allow the remote data source to process the join itself, assuming that the data source is capable of performing such operation. With reference to the query (4) described above, replacing 'mytab' with a nickname results in the following query:

```
(7)     SELECT n2.c1, n1.c4
            FROM mynick2 n2, mynick n1
            WHERE n2.c2 < 50
                AND n1.c5 = n2.c3
                AND n1.c6 = 75
```

For this query, the federation server 10 could present three additional query fragments in addition to query fragments (5) and (6):

```
(8)     SELECT n2.c1, n2.c2, n2.c3
            FROM mynick2 n2
            WHERE n2.c2 < 50
(9)     SELECT n2.c1, n2.c2, n2.c3
            FROM mynick2 n2
            WHERE n2.c2 < 50
                AND n2.c3 = :H2
(10)    SELECT n2.c1, n2.c2, n2.c3, n1.c4, n1.c5, n1.c6
            FROM mynick2 n2, mynick n1
            WHERE n2.c2 < 50
                AND n1.c5 = n2.c3
                AND n1.c6 = 75
```

Other query plans can also be constructed from these fragments, such as a plan using query fragments (5) and (8), a plan using query fragments (5) and (9), a plan using query fragments (6) and (8), and a plan using query fragment (10).

A data source wrapper is free to refuse a particular query fragment. In the example associated with query (7), if the wrapper was not capable of processing a join between two nicknames, the wrapper would return no reply in response to query fragment (10). If the federation server 10 doesn't receive enough valid replies to build a viable query plan, the entire query is considered un-planable and an error will result.

The query compiler of the federation server and data source wrappers may be unable to generate a viable query plan for a number of other reasons. A user may code a query that is beyond the combined capabilities of the wrapper(s) and federation server. Alternatively, the user may code a valid query, but the practicalities of query planning prevent the generation of a valid plan. In addition, issues such as parallelism and data source restrictions can further complicate the query process.

Many relational query engines introduce an additional step in query planning before optimization. This step, called query rewrite, is a rule-based process that replaces some SQL constructs with other, equivalent constructs. Most importantly, query rewrite may introduce processing boundaries within a query plan. These boundaries limit what the optimization phase may work with and therefore may limit what is presented to a wrapper during query planning. For example, in certain scenarios, a query rewrite will replace simple SQL constructs, such as a BETWEEN predicate being converted to the equivalent <= and >= predicates, a string of OR predicates being converted to an IN predicate, etc.

Query rewrite may also add predicates to potentially speed query processing. For example, consider the predicate: c1 LIKE 'abc %'. A possible query rewrite may be: c1>='abcαααα' AND c1<='abcωωωωωω' (where 'α' and 'ω' represent high and low character values, respectively). Such a query rewrite may occur in scenarios in which the >= and <= operators are much less expensive to process than a LIKE operator and a value that doesn't meet one of the simple predicate tests cannot meet the LIKE test. The additional expressions are referred to as twins. In more complex scenarios, some sub-queries may be rewritten as joins.

Of particular concern to federated query processing are situations where new SELECT operators are introduced into the query plan and certain nickname predicates are separated from the nickname access by a processing boundary. Such boundaries may be introduced by requirements for parallel query processing. For example, a lower SELECT operator may be executed independently on multiple nodes, with an upper SELECT operator combining the results of these parallel executions. Because each SELECT is optimized separately, the federation server cannot present the predicate to the wrapper in a query fragment.

Figure 7:
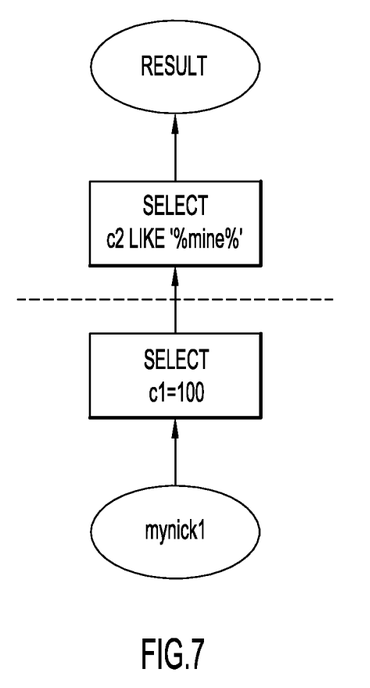

As an example of this issue, consider query fragment (2). A scenario might occur in which a query rewrite divides the query plan into two parts and places one of the nickname predicates separate from the nickname access. Generally, this action involves moving the predicate to a higher operator, which is referred to as predicate pull-up. The converse action of sending an operation to a remote data source is called push down. The rewritten query plan is depicted in FIG. 7. A problem that can occur is that the data source wrapper will only see the lower SELECT box of the plan and not the LIKE predicate in the pull-up SELECT box. The reason this can be a problem is described as follows.

The closer a data source is to the relational model, the better it can fit into a federated relational system. For instance, a more relational data source can generate a correct answer whether it sees all of the potential predicates or not. In federating a relational data source, it does not matter whether the federation server or the data source processes a particular predicate, or the order in which those predicates are processed. It may often be cheaper to have the predicate pushed down, but that is independent of whether or not the results of the query will be correct. In contrast, certain non-relational data sources have requirements and restrictions that move them further from the relational model. One of the fundamental problems with modeling non-relational data sources is that the federated model implies that a wrapper will see all of the predicates that apply to a particular nickname. However, as noted in the previous example showing a predicate push down (depicted as the rewritten query plan of FIG. 6), this is not always true.

Similar problems can also occur with predicate pull-up. If the predicate that supplies the input value to the algorithm is pulled up, away from the operator containing the nickname access, then the nickname access cannot be planned because it is missing a required element. In this case, the query cannot be planned and a failure occurs before the query can be executed.

One of the difficulties with this situation is the fact that query planning, from the wrapper's point of view, is stateless, and there is no context. The wrapper sees only the query fragment that it is given and does not know about its relationship with the original query. So, for example, a wrapper cannot simply produce an error message when a query fragment is presented and is missing a required predicate. The predicate could be missing for one of the following scenarios:

1. The predicate is part of a join and may be presented in a different query fragment. For instance, see the difference between (8) and (9) above. If the predicate on "n2.c3" is a required predicate, the wrapper cannot simply produce an error when it receives fragment (8), because it may later see fragment (9). It can only return a "no plan" in response to (8).

2. The predicate has been pulled up by the optimizer. The original query may be valid, but it cannot be planned.

3. The predicate was never supplied by the user. In this case, the original query is in error.

Because little context is provided between query fragments, it is very difficult to produce a meaningful error message to the federation server if either the second or third scenario occurred. All that is known is that the wrapper didn't accept enough query fragments to produce a viable plan. A similar issue can arise with relational data sources, such as a data source with a function or unique database file that cannot be compensated for by the federation server. Using such a function in a query creates an expression or predicate that must be pushed down to the remote data source. If the query compiler is unaware of this requirement, actions by the query compiler like those listed above may result in query plans that cannot be executed.

More difficult are data sources whose processing may be altered, depending on the presence or absence of input values. Another example is a web service that provides the shortest route between two points. Given a beginning and end point, it provides only one route, not all possible routes. Missing either of these points means that the query cannot be processed, since these points are required. There may also be a way-point, which is an intermediate point through which final route must pass. Given the same beginning and end points (e.g., 'A' and 'B'), the web service may return different results if no way-point is provided, or if way-point 'C' is provided. If the original query includes a predicate supplying 'C', the results will be correct if the predicate is presented to the data source. However, if a query rewrite pulls the 'C' predicate up, the final results will be incorrect, since the web service produced a route without using the way-point. If the user is fortunate, the final result will at least be empty, because the filtering predicate on 'C' will not pass the result returned by the web service, but if the user is unfortunate, an incorrect result may be generated. Again, because there is no context to a query fragment presented to the wrapper, it is not possible to identify situations where an "optional" predicate has not been presented and produce a reasonable error message.

Compound and complex expressions can also cause problems with query planning. Compound expressions refer to expressions that reference values from two or more data sources (or separate expressions with a cross-dependency.) Complex expressions refer to expressions that may be addressed to a single data source, but contain a mix of operations, some that may be processed by the data source and some that may not. These can occur as part of predicates and may appear as head (projection) expressions.

An example of a complex expression is shown in query fragment (11). The data source, 'ds1' is capable of processing a unique function, 'ds1fn', but is not capable of processing any arithmetic operators:

| (11) | SELECT ds1fn(n1.c1+1), ds1fn(n1.c2)*2 FROM ds1 nick n1 |
|---|---|

The first expression in query fragment (11) cannot be planned at all. The second expression may not be planned if the query compiler is incapable of decomposing expressions.

An example of a compound expression is shown in query fragment (12) in which two data sources, having the nicknames 'ds1nick and 'ds2nick', are queried and each data source implements a unique function that may be used in a head expression. The functions 'ds1fn' and 'ds2fn' are implemented by the same two data sources respectively. Assume these two functions cannot be compensated for by the federation server:

| (12) | SELECT ds1fn (n2.c1), ds2fn (n1.c4) FROM ds2nick n2, ds1nick n1 WHERE n1.c5 = n2.c3 |
|---|---|

Query fragment (12) creates a cross-dependency between the two data sources, such that no join order can be chosen that will satisfy the query.

In view of the many problems associated with optimizing and compiling query fragments associated with accessing and querying data sources, in particular, non-relational data sources, it is important for the non-relational wrappers to participate in the query planning process from the very beginning instead of near the end. However, it is also important to implement such participation in a suitable manner that does not dramatically alter the fundamental nature of the process.

Figure 3:
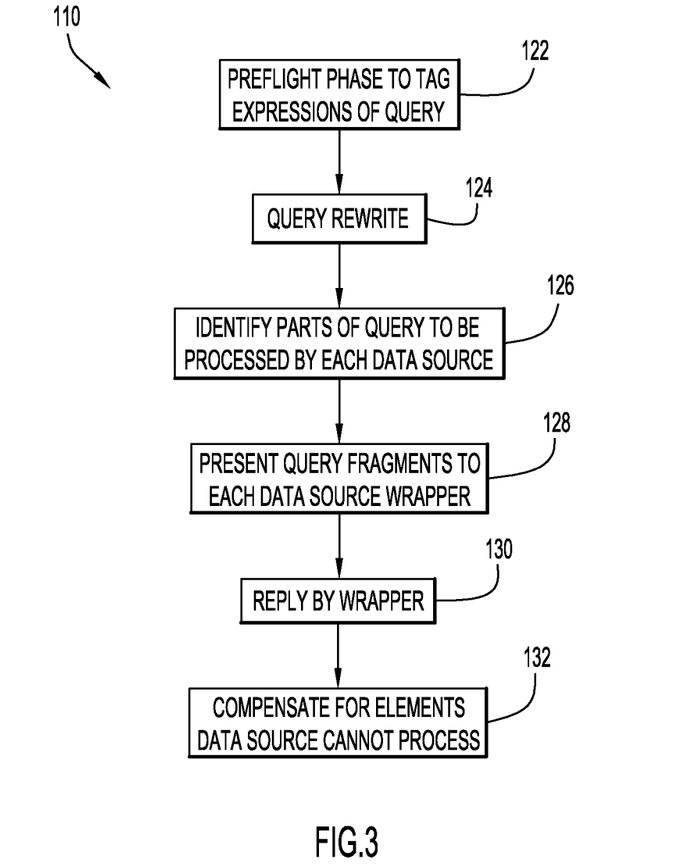
FIG. 3 provides a flowchart depicting an example embodiment of method steps associated with formulating a query plan in accordance with the present invention.

In accordance with embodiments of the present invention, a query plan is formulated by the federation server 10 in accordance with the processing steps set forth in FIG. 3. In particular, all of the expressions that reference columns from non-relational nicknames are tagged with a list of tags. In an example embodiment, the tags contain two related pieces of information: (1) the data source with which the predicate is best associated; and (2) the nature or type of the association.

The nature of the association for a particular tag refers to the degree in which an expression should be pushed down the wrapper of a data source. As previously described, some expressions must be presented to the wrapper in order for a query to be planned at all. These expressions are tagged by the wrapper with a MUST_PUSH tag. This not only includes those expressions that are absolutely required for the data source to process the query, but those that may or may not be present in the user's original query, but if present in the query must be handled by the wrapper. Other expressions can never be processed by the wrapper and/or remote data source and therefore will be tagged by the wrapper with the NEVER_PUSH tag. Finally, some expressions may be processed by the wrapper/data source or by the federation server with no difference in the correctness of the answer. These expressions are tagged by the wrapper as MAY_PUSH.

For the first item of information in a tag (the associated data source), the query compiler of the federation server needs to know not only to what degree an expression should be pushed down, but which wrapper will process the expression. This is especially true in the case of a join between two different data sources or a join between nicknames for a single data source that does not support joins. In both cases, the semantics of the data sources may prevent any workable plans.

Expressions that reference operations from two or more data sources present other issues. One wrapper may treat data from a second source simply as constants, but it may not disregard operations that it cannot implement. If the expression, without the unknown operation, would be NEVER_PUSH or MAY_PUSH for the current wrapper, then the wrapper must tag the expression as NEVER_PUSH. If the expression would be tagged MUST_PUSH without the unknown operation, then the wrapper must raise an error.

Expressions are tagged during an initial preparation or "preflight" phase (step 122 in FIG. 3). The tags may then be used by the query rewrite and optimizer processes. This is in the form of a simple conditional on the rewrite or plan enumeration rule. For example, if applying the rule would result in a MUST_PUSH expression being separated from its associated nickname, then do not apply the rule. In addition, another rewrite rule can separate NEVER_PUSH expressions from the associated nickname access. This rule will prevent extra projection columns that would only be pushed down as constants.

The preparation or preflight phase for query planning occurs prior to the start of the main query rewrite operations, but after predicates have been rewritten into conjunctive normal form. The preflight operation must be able to see all of the expressions from the original query. At later stages of query compilation, the query compiler may only see a limited set of expressions. The preflight cannot work on a subset.

The preflight phase uses a slightly modified version of the request object used by the existing non-relational query planning mechanism. The request contains the same three lists (i.e., quantifiers or nicknames, head expressions and predicates). The modification consists of a new method, tag_expression(expression,action,source), that the wrapper will use to apply the tag to an expression predicate.

The wrapper itself must implement a new method, preflight_plan(request), that performs the work of tagging the expressions. Note that, unlike later query planning operations, no reply is built—the request in this case represents fragments of the original query syntax tree, which is marked in place.

The preflight phase can be configured to operate utilizing the following algorithm:

```
1.    for each data source D
2.        initialize a new request, R, with an empty expression list and
              nickname list
3.        for each expression E in the original query
4.            if E references nickname N from D
5.                add N to R.nicknames if not already present
6.                add E to R.expressions
7.        call D.preflight_plan(R)
8.    for each expression E in the query
9.        call compiler_tag_expression(E)
```

Each wrapper implements D.preflight_plan(R) as:

```
1.    for each expression E in R.expressions
2.        En = top expression node of E
3.        A = MAY_PUSH
4.        call D.preflight_expression(En, A)
5.        call R.tag_expression(En, A, D)
```

Each wrapper implements D.preflight_expression(En, A) as:

```
1.    if En is required by D
2         if A == NEVER_PUSH
3.            error - invalid expression for D
4.        else
5.            A = MUST_PUSH
6.    else if En cannot be implemented by D
7.        if A == MUST_PUSH
8.            error - invalid expression for D
9.        else
10.           A = NEVER_PUSH
11.   for each child Ec of En
12.       call D.preflight_expression(Ec, A)
```

Finally, R.tag_expression(En, A, D) is implemented as:

```
1.    if En has tags
2.        if A == NEVER_PUSH
3.            En.add_tag(A,D)
4.        else if A == MAY_PUSH
5.            Ax = MAY_PUSH
6.            for each tag T attached to En
7.                if T.A == MUST_PUSH
8.                    Ax = NEVER_PUSH
9.            En.add_tag(Ax,D)
10.       else if A == MUST_PUSH
11.           for each tag T attached to En
12.               if T.A == MAY_PUSH
13.                   T.A = NEVER_PUSH
14.               else if T.A == MUST_PUSH
15.                   error - conflict between sources
16.           En.add_tag(A,D)
17.       else
18.           En.add_tag(A,D)
```

The actions of tag_expression( ) are summarized in the following table (Table 1). Its purpose is to reconcile between the needs of two data sources (data source A and data source B). MAY_PUSH(x) means that an expression has been identified as being acceptable, but not required for datasource "x". MAY_PUSH(null) is an initial state, assuming that the expression may be pushed to any data source. MUST_PUSH(x) means that the expression must be pushed to datasource "x", while NEVER_PUSH(x) means that the expression may never be pushed to datasource "x". Thus, the identification provides a degree to which a particular data source can process the expression. An expression may have more than one tag, as noted by the table. An error arises when there is a conflict between tags, such as when both data sources require that an expression be pushed.

TABLE 1

| tag_expression( ) logic | | | |
|---|---|---|---|
| | NEVER_PUSH(B) | MAY_PUSH(B) | MUST_PUSH(B) |
| MAY_PUSH(NULL) | NEVER_PUSH(B) | MAY_PUSH(B) | MUST_PUSH(B) |
| NEVER_PUSH(A) | NEVER_PUSH(A) NEVER_PUSH(B) | NEVER_PUSH(A) MAY_PUSH(B) | NEVER_PUSH(A) MUST_PUSH(B) |
| MAY_PUSH(A) | MAY_PUSH(A) NEVER_PUSH(B) | MAY_PUSH(A) MAY_PUSH(B) | NEVER_PUSH(A) MUST_PUSH(B) |
| MUST_PUSH(A) | MUST_PUSH(A) NEVER_PUSH(B) | MUST_PUSH(A) NEVER_PUSH(B) | Error |

While not strictly necessary, the conversion of MAY_PUSH expressions into NEVER_PUSH may speed processing in the query compiler, as fewer decisions will need to be made. With this logic, all expressions will be tagged and any required-expression conflicts between sources will be identified.

Once the wrappers have tagged the expressions, the query compiler must make a pass through the expressions to determine whether any query rewrites are required (step 124 in FIG. 3). The query compiler must examine all of the MAY_PUSH and NEVER_PUSH expressions to determine if they require compensation, or if there is a conflict between the compiler's compensation capabilities and the wrapper's capabilities.

The logic for the compiler's compiler_tag_expression(E) function is as follows:

```
1.   if E can be compensated
2.      if E has no tags
3.         E.add_tag(NEVER_PUSH, null)
4.      else
5.         if E has no tags or E is NEVER_PUSH
6.            error - compensation not possible
7.         else if E is MAY_PUSH(D)
8.            E.add_tag(MUST_PUSH, D)
```

A rewrite or enumeration rule either applies to a particular situation or it does not, and this determination can be made by a condition that is part of the rule code. This condition must be extended to add the following logic: If the affected query fragments contain predicates that are marked MUST_PUSH and the rule will pull these predicates up, then do not execute the rule.

During query planning, after query rewrite, the optimizer will work on sections of the overall query, planning these in various combinations, and identifying parts of the query to be processed by each data source (step 126 of FIG. 3). During that phase, the query optimizer builds a request using the expressions available to it at the time and submits the request to each data source wrapper (step 128 of FIG. 3). Each data source wrapper then responds with either an accepted query fragment, with a subset of the presented expressions, or it indicates that the particular request cannot be processed by the data source (step 130 of FIG. 3). The optimizer then compensates for elements that each data source cannot process (step 132 of FIG. 3).

With the tagged expressions, before building a request, the query compiler must reconcile the expressions available at the time, with the full set of expressions from the original query. If there are any MUST_PUSH(x) expressions for the current data source, "x", that are not available at that point in query planning, the compiler must not submit a request to the data source.

A performance issue arises with the existing federated query planning model. If a query fragment references a nickname column in a predicate, then that column must be put on the fragment's head expression list, even if the column would not normally be projected from the fragment. This must be done in case the query compiler must add a compensation operation for predicates that the wrapper has rejected. Because the wrapper must dutifully project all columns, it's possible that execution cycles will be wasted returning information that is not actually used in the plan. This can be a serious performance problem in the case of data sources that perform operations on large objects (such as objects several megabytes in length).

With tagged predicates, the optimizer can do a better job in determining what columns need to be added to the head expression list of a fragment. If a column is referenced only in MUST_PUSH predicates, then it does not need to be added to the projection list. On the other hand, if the column is referenced outside of the query fragment or is referenced in NEVER_PUSH predicates, then it must be added to the head expression list. A MAY_PUSH predicate can be treated as MUST_PUSH, since MAY_PUSH represents a preflight commitment by the wrapper to accept a MAY_PUSH predicate when presented during query optimization.

The optimizer is also able to leave any NEVER_PUSH predicates off of the query fragment, reducing the amount of information that must be processed by the wrapper's optimization phase. That phase may be further simplified because the wrapper will see only predicates that are known to be acceptable.

Partial compensation of query fragments can also be achieved in accordance with embodiments of the invention. In typical query planning, an expression is either handled by the wrapper/data source or it is handled by the federation server. If a data source cannot exactly match the federation server's semantics, then that expression cannot be pushed to the data source. There are expressions, though, that would benefit from at least partial processing by the data source. By use of the tagging of query fragments in accordance with the invention embodiments and the ability to create twin expressions, it is possible to split the processing of an expression between the federated server and the data source.

To implement partial processing, the following tag actions, PART_MAY_PUSH and PART_MUST_PUSH, are implemented. The PART_MAY_PUSH tag indicates to the query compiler that an expression may be pushed to the data source, but if it is pushed, the federated server must still provide compensation. The PART_MUST_PUSH tag indicates that the predicate must be pushed to the data source, but, again, the federated server must provide some further compensation.

One significant change in the algorithms above is how tag_expression( ) handles tagging with the new actions. Table 2 summarizes this change. In this table, MAY_PUSH has been abbreviated MA, NEVER_PUSH as NV, MUST_PUSH as MU, PART_MAY_PUSH as PA and PART_MUST_PUSH as PU.

TABLE 2

| tag_expression( ) actions for partial compensation | | | | | |
|---|---|---|---|---|---|
| | NV(B) | MA(B) | MU(B) | PA(B) | PU(B) |
| MA(N) | NV(B) | MA(B) | MU(B) | PA(B) | PU(B) |
| NV(A) | NV(A) | NV(A) | NV(A) | NV(A) | NV(A) |
| | NV(B) | MA(B) | MU(B) | PA(B) | PU(B) |
| MA(A) | MA(A) | MA(A) | NV(A) | MA(A) | NV(A) |
| | NV(B) | MA(B) | MU(B) | PA(B) | PU(B) |
| MU(A) | MU(A) | MU(A) | error | MU(A) | error |
| | NV(B) | NV(B) | | NV(B) | |
| PA(A) | PA(A) | PA(A) | NV(A) | PA(A) | NV(A) |
| | NV(B) | MA(B) | MU(B) | PA(B) | PU(B) |
| PU(A) | PU(A) | PU(A) | error | PU(A) | error |
| | NV(B) | NV(B) | | NV(B) | |

Additional optimizer rules are also provided to create twins of partial expressions that are scheduled for pushdown and then to mark one twin as MUST_PUSH and the other as NEVER_PUSH. These rules must be applied late in the optimization process, or there is a risk of introducing twins that are not actually necessary. Creating MUST_PUSH expressions that are not actually necessary may result in poor query execution, as MUST_PUSH expressions limit the query compiler's ability to optimize a query. In addition, during the compiler's part of the preflight, it must determine that any NEVER_PUSH twin can actually be processed by the federator. Without expression decomposition, it isn't possible for the federation sever to handle, for example, a PART_MUST_PUSH that contains a unique database file that cannot be executed by the federation server.

The following is an example algorithm describing the logic for a PARTIAL_PUSH rule creating twins of partial expressions scheduled for a pushdown:

```
1.   for each expression E
2.       if E may be twinned
3.           if E is PART_MAY_PUSH(x) or
             PART_MUST_PUSH(x)
4.               create twin of E, E_w
5.               E.replace_tag(NEVER_PUSH, null)
6.               if E is PART_MAY_PUSH(x)
7.                   E_w.add_tag(MAY_PUSH, x)
8.               else
9.                   E_w.add_tag(MUST_PUSH, x)
10.      else (E may not be twinned)
11.          if E is PART_MAY_PUSH
12.              change PART_MAY_PUSH(x) to
                 NEVER_PUSH(x)
13.          else if E is PART_MUST_PUSH
14.              error - partial compensation not possible
```

An example of applying the logic rules as set forth above, consider a data source that performs case-insensitive string comparisons, and a federation server whose semantics require case-sensitive comparisons. Given three rows of input, "ABC","AbC" and "XYZ", the predicate "value='ABC'" will return two rows from the data source, but only one from the federation server. Without partial compensation, the predicate would have to be marked NEVER_PUSH and the remote pushdown operation would return all three rows to the federation server. Using partial pushdown, the operation need only return two rows ("ABC" and "AbC"), reducing network traffic. The predicate would be marked PART_MAY_PUSH. During query rewrite, twin equivalents would be created, one marked MUST_PUSH and the other marked NEVER_PUSH. The MUST_PUSH predicate is pushed to the data source, while the NEVER_PUSH predicate remains as compensation in the federation server. Although this introduces some duplication, if the selectivity of the pushed predicate is sufficiently high, the savings in transfer between the data source and the federation server will more than make up for the extra processing.

Thus, the present invention provides the federation server with the ability to make better decisions about how a query may be processed by marking or tagging expressions in query fragments and receiving information from each data source (in particular, each non-relational data source) regarding whether such tagged expression can be processed by such data source and/or processing order requirements by the data source in relation to that tagged expression as well as other tagged expressions in query fragments.

By providing an indicator for each of the analyzed expressions in a federation server (e.g., by marking SQL expressions), a non-relational data source can provide instructions to the federation server about the processing order requirements for the data source. This allows the federation server to make better decisions about how the query may be processed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Perl, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of generating a query plan for executing a query within a relational database system including at least one non-relational data source each associated with an interface comprising:
   analyzing expressions that each reference at least one non-relational data source within a query for the database system via each interface associated with the at least one non-relational data source referenced by that expression;
   determining for each analyzed expression at least one entity capable of processing the analyzed expression for executing the query, wherein each entity includes one of the database system and the interface associated with the referenced non-relational data source;
   providing at least one indicator for each of the analyzed expressions, wherein each indicator is associated with the non-relational data source referenced by that analyzed expression and indicates the entity determined to process the analyzed expression and a degree to which the entity processes the analyzed expression, wherein at least one analyzed expression includes at least two indicators associated with different non-relational data sources;
   comparing the indicators of each expression to reconcile the entities of those indicators for that expression based on the degree of processing to determine a resulting entity to process that expression and selectively adjust those indicators based on the reconciliation; and
   generating the query plan for execution of the query, via the database system, based on the indicators for the expressions of the query, wherein generating the query plan includes:
      identifying expressions of the query to be processed by the referenced non-relational data sources;
      submitting a request including one or more of the identified expressions to corresponding ones of the associated interfaces, wherein the corresponding interfaces each produce a reply indicating the expressions within the request handled by that non-relational data source; and
      adjusting the query plan by adding appropriate operations to the query plan based on the reply from each corresponding interface to compensate for the expressions within the query the non-relational data sources are unable to process.

2. The method of claim 1, wherein each indicator comprises an indication of a specified data source with which an analyzed expression is best associated, and an indication of a type of association.

3. The method of claim 1, wherein an expression references a non-relational data source by referencing a column for a nickname of the specified non-relational data source.

4. The method of claim 1, wherein each indicator provides an indication of a degree to which a specified data source can process an analyzed expression.

5. The method of claim 4, wherein an indication of degree comprises one of: must push the analyzed expression for processing by the interface for the specified data source, never push the analyzed expression for processing by the interface for the specified data source and may push the analyzed expression for processing by the interface for the specified data source.

6. The method of claim 1, wherein at least one analyzed expression is unable to be completely processed by a determined non-relational data source, and the at least one analyzed expression is partially processed by the database system and partially processed by the interface for a respective non-relational data source determined to process the analyzed expression.

* * * * *